(12) United States Patent
Sakakima (10) Patent No.: US 7,657,107 B2
(45) Date of Patent: Feb. 2, 2010

(54) IMAGE ENCODING METHOD AND IMAGE ENCODING APPARATUS

(75) Inventor: Eito Sakakima, Kanagawa-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 11/399,336

(22) Filed: Apr. 7, 2006

(65) Prior Publication Data

US 2006/0233445 A1    Oct. 19, 2006

(30) Foreign Application Priority Data

Apr. 13, 2005   (JP) .............................. 2005-115523

(51) Int. Cl.
*G06K 9/36*    (2006.01)
*G06K 9/46*    (2006.01)

(52) U.S. Cl. ...................................... 382/232

(58) Field of Classification Search ....................... None
See application file for complete search history.

(56) References Cited

U.S. PATENT DOCUMENTS

| | | | |
|---|---|---|---|
| 5,303,058 A * | 4/1994 | Fukuda et al. | 382/234 |
| 6,195,026 B1 * | 2/2001 | Acharya | 341/60 |
| 6,360,014 B1 * | 3/2002 | Boon | 382/233 |

FOREIGN PATENT DOCUMENTS

JP    10-215366    8/1998

* cited by examiner

*Primary Examiner*—Yuzhen Ge
(74) *Attorney, Agent, or Firm*—Fitzpatrick, Cella, Harperr & Scinto

(57) ABSTRACT

In order to implement image encoding appropriately, an image encoding method includes: a detection step of detecting that data having a predetermined value exists within a data group (an encoded image) configured of a series of data strings; a transformation step of transforming the predetermined value that exists within the data group into another value; and a situating step of situating the data having the predetermined value at a desired position within the data group.

4 Claims, 11 Drawing Sheets

EXAMPLE OF BIT OPERATION

| BIT OPERATION VALUE | #62 HUFFMAN CODE | #62 CATEGORY | TOTAL LENGTH |
|---|---|---|---|
| 0 | 1011 | 4 | 8(8+0) |
| 1 | 1111111110000010 | 9 | 25(8+8+8+1) |
| 2 | 11010 | 5 | 10(8+2) |
| 3 | 00 | 1 | 3 |
| 4 | 01 | 2 | 4 |
| 5 | 1111000 | 6 | 13(8+5) |
| 6 | 100 | 3 | 6 |
| 7 | 11111000 | 7 | 15(8+7) |

AFTER ENTROPY DECODING PROCESSING

| 1 | 2 | 1 |
|---|---|---|
| 3 | 2 | 1 |
|   | 8 | 682 |

TABLE FOR INVERSE QUANTIZATION

| 3 | 3 | 2 |
|---|---|---|
|   | 3 | 0 |
|   | 0 | 0 |

↓ INVERSE QUANTIZATION (MULTIPLICATION)

AFTER INVERSE QUANTIZATION

| 3 | 6 | 2 |
|---|---|---|
|   | 6 | 0 |
|   | 0 | 0 |

FIG. 7

IMAGE ENCODING METHOD AND IMAGE ENCODING APPARATUS

FIELD OF THE INVENTION

The present invention relates to an image encoding method and an image encoding apparatus.

BACKGROUND OF THE INVENTION

Japanese Patent Application Laid-Open No. 10-215366 discloses a compressed-image-data extraction method in which, each time a boundary between encoded data items is detected, the beginning-point positional information and the ending-point positional information of the encoded data for the corresponding image per processing unit are stored, and the boundary position is identified based on the stored positional information items.

For the purpose of extracting encoded data for a desired partial image from compressed image data, the technique disclosed in Japanese Patent Application Laid-Open No. 10-215366 separately stores and utilizes positional information with which the boundary of the partial image can be identified.

SUMMARY OF THE INVENTION

The present invention realizes a method of enabling image encoding to be implemented appropriately.

For that purpose, an image encoding method according to the present invention includes: a detection step of detecting that data having a predetermined value exists within a data group configured of a series of data strings; a transformation step of transforming the predetermined value that exists within the data group into another value; and a situating step of situating the data having the predetermined value at a desired position within the data group.

An image encoding apparatus according to the present invention has a detection unit adapted to detect that data having a predetermined value exists within a data group configured of a series of data strings; a transformation unit adapted to transform the predetermined value that exists within the data group into another value; and a situating unit adapted to situate the data having the predetermined value at a desired position within the data group.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

An embodiment of the present invention will be explained below.

An image encoding method and an image encoding apparatus according to the present invention relate to an encoding method and an apparatus for encoding digital images, respectively. In particular, in so-called JPEG (Joint photographic Experts Group), for encoding of still images, it is impossible to identify boundary positions through normal encoding; therefore, JPEG has a feature to which the present invention is suitably applied.

An embodiment of the present invention will specifically be explained below, with reference to FIG. 1, while exemplifying a case in which the embodiment is applied to JPEG images.

Figure 1:
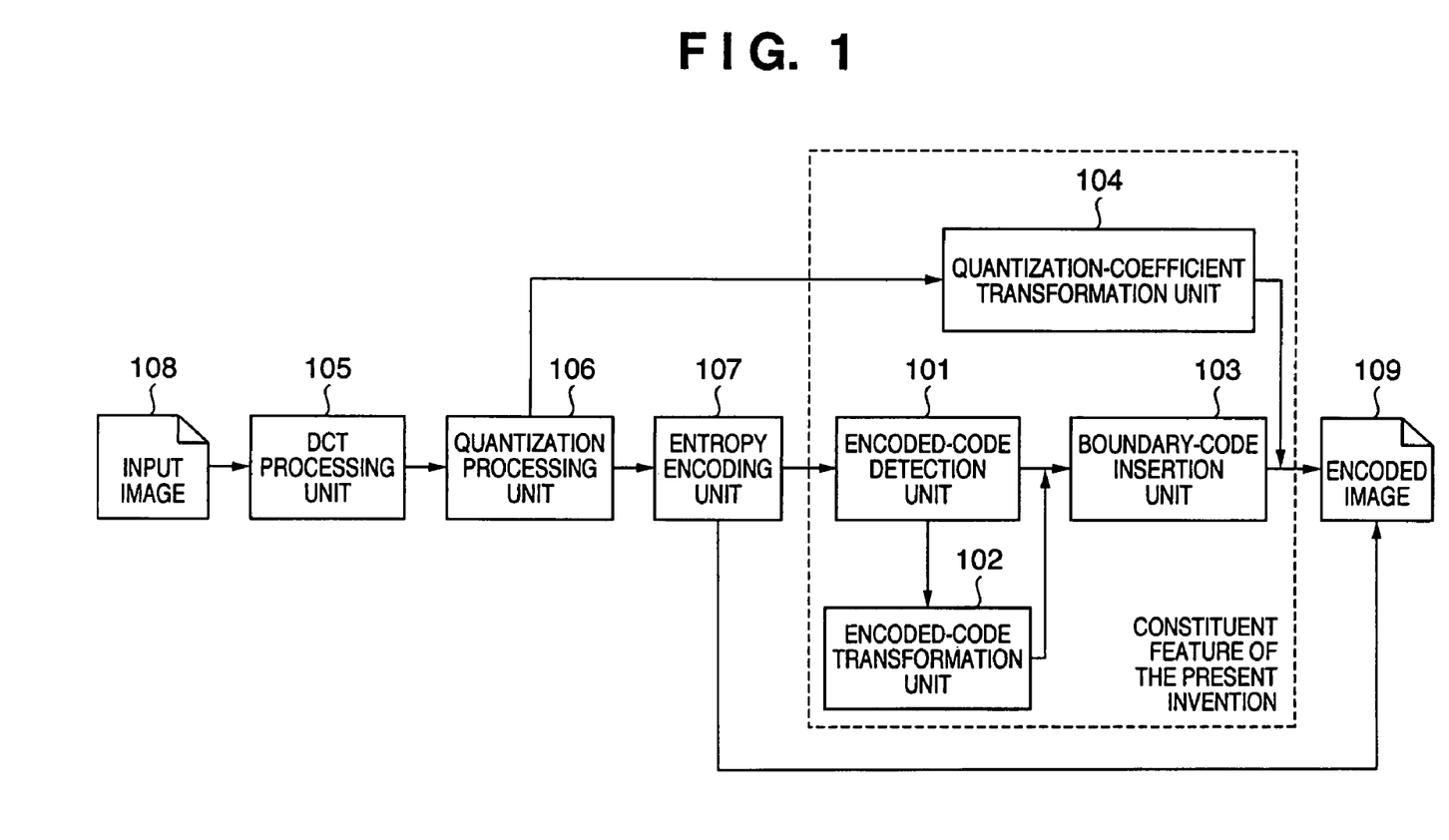
FIG. 1 is a block diagram illustrating an encoder according to an embodiment of the present invention.

FIG. 1 is a block diagram illustrating an outline of an encoder (image encoding apparatus) for JPEG images. In the first place, the outline of an encoding method for JPEG images will briefly be explained with reference to FIG. 1.

Figure 2:
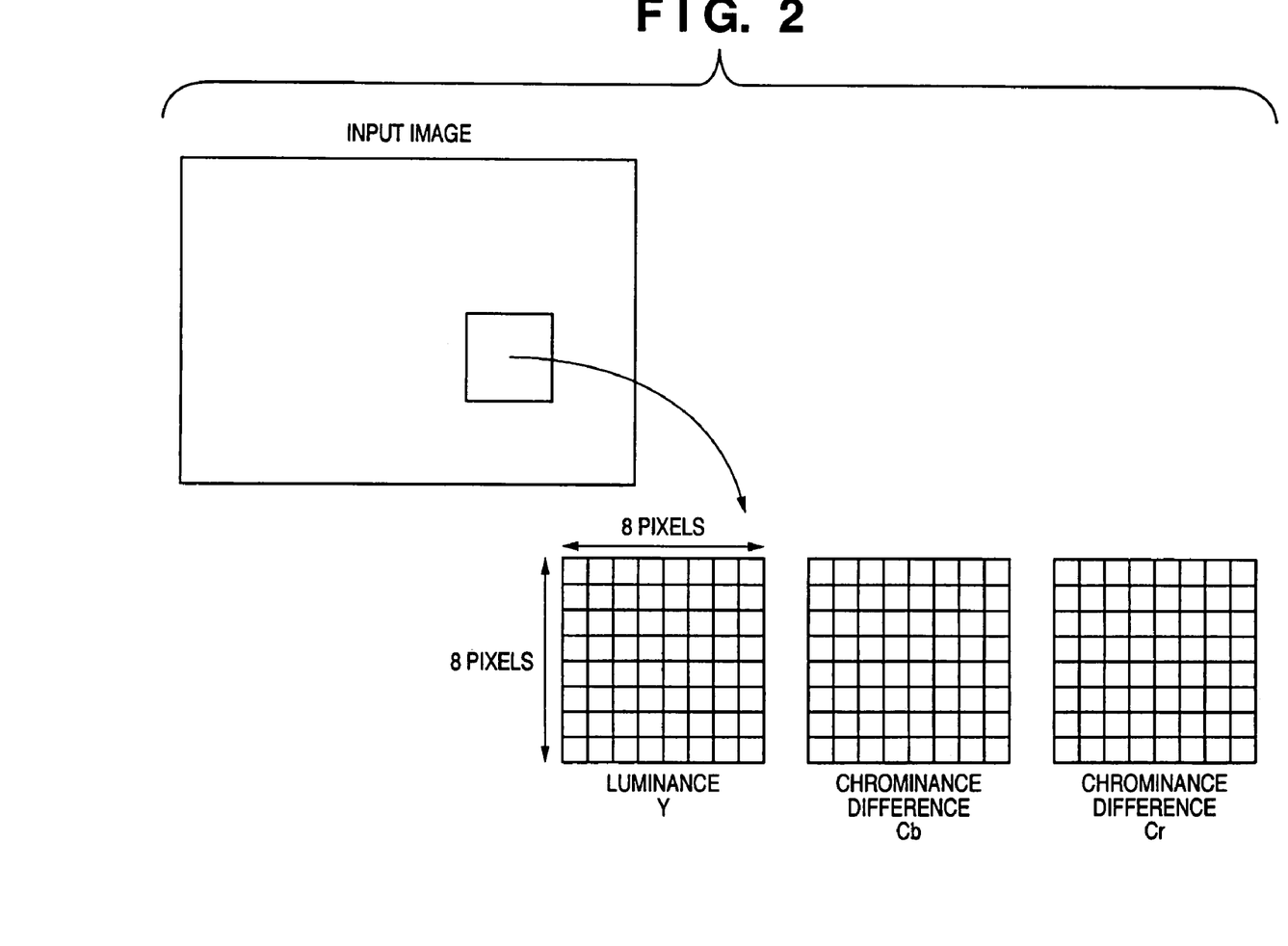
FIG. 2 is a view illustrating a block as an encoding unit for JPEG encoding processing.

A DCT processing unit 105 applies to an input image 108 to be inputted a DCT (Discrete Cosine Transform) so as to implement a domain transformation from a spatial domain to a frequency domain. As illustrated in FIG. 2, the input image 108 is divided, for each of luminance Y, chrominance difference Cb, and chrominance difference Cr, into blocks each of which has 8-by-8 pixels. Then, the DCT transformation processing is applied to each block.

A quantization processing unit 106 applies quantization processing to pixel values that have been DCT-transformed by the DCT processing unit 105, on a basis of an 8-by-8 pixel block, as is the case with the DCT processing unit 105. The quantization signifies division computation applied to each pixel in an 8-by-8 pixel block. A set of coefficients utilized for the division computation is called a quantization table; a value is set for each of the pixels in an 8-by-8 pixel block, and the set of coefficients and the pixels are tabularized. The quantization table can be set for each of luminance and chrominance difference and can be changed on a basis of an image to be encoded.

An entropy encoding unit 107 applies entropy encoding to pixel values quantized by the quantization processing unit 106. Entropy encoding includes, for example, Huffman encoding, arithmetic encoding, and the like; however, Huffman encoding is utilized for general JPEG images. Here, the Huffman encoding processing for JPEG images will briefly be explained with reference to FIG. 3.

Figure 3:
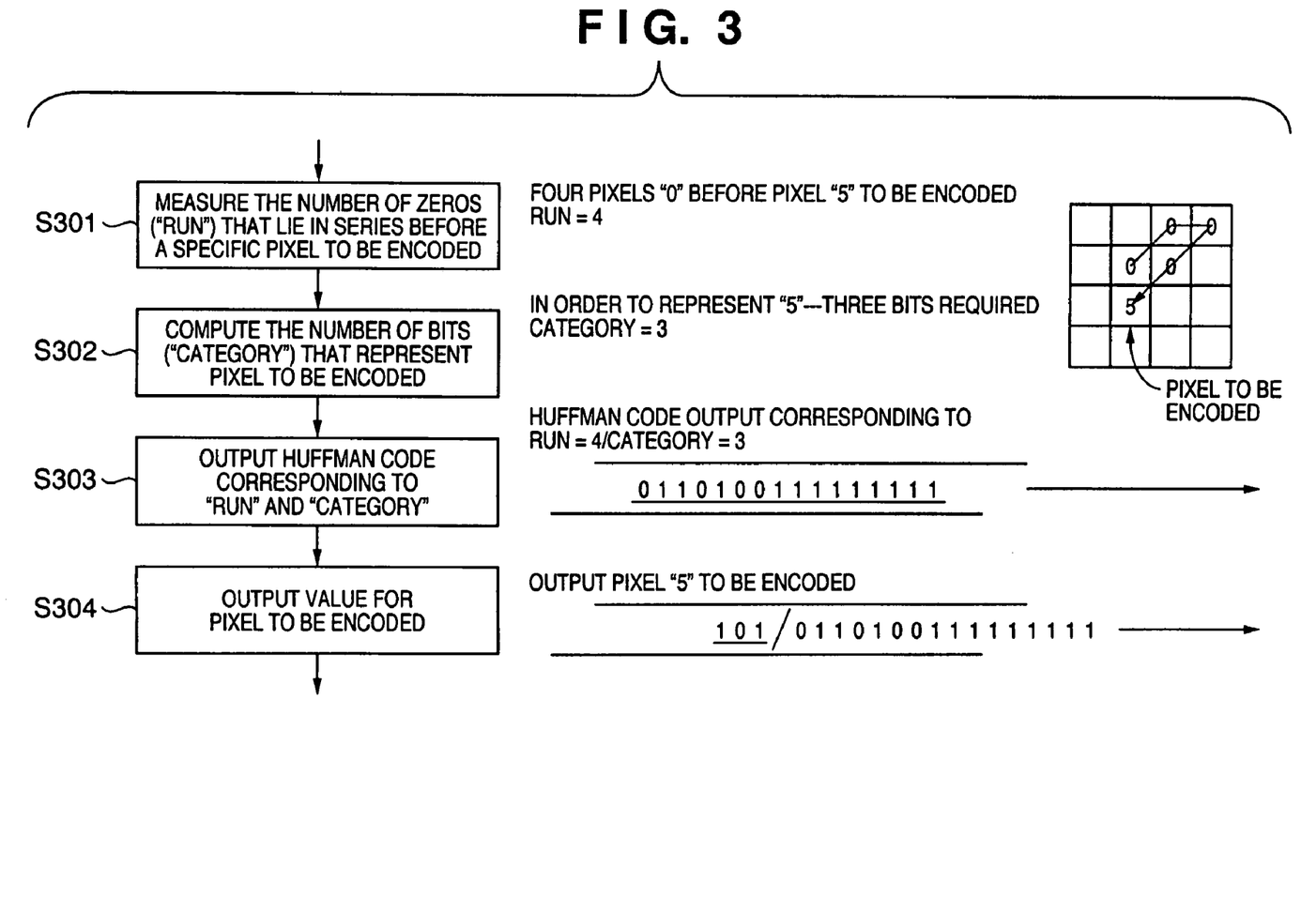
FIG. 3 is a set of charts illustrating a procedure of Huffman encoding in JPEG encoding processing.

The Huffman encoding processing is implemented on a basis of a quantized pixel. Because being in a configuration of an 8-by-8 pixel two-dimensional block, the quantized pixels are converted to be one-dimensional, in a zigzag manner from top left and then receive encoding processing.

In the first place, in the step S301, the number of zeros (referred to as "run", hereinafter) are measured that lie in series before a specific pixel to be Huffman-encoded. In the example represented in FIG. 3, "run=4". Next, in the step S302, the number of bits (referred to as category, hereinafter) necessary to render the pixel to be encoded is computed. In the example represented in FIG. 3, because the value for the pixel to be encoded is "5", the necessary category is "3". Then, in the step S303, the Huffman code that is uniquely decided through the category and the run is outputted as encoded data. The Huffman code "1111111110010110" represented in FIG. 3 is an example; it is possible to set a different Huffman code for each image to be encoded. In the last place, in the step S304, a bit string that indicates the value for the pixel to be encoded is outputted. In the example represented in FIG. 3, the bit string "101" that indicates the pixel "5" to be encoded is outputted.

Through the Huffman encoding processing described above, in FIG. 1, an encoded image (a group of data items configured of a series of data strings) 109 is outputted from the entropy encoding unit 107. This concludes the explanation for the outline of the JPEG encoding method.

Next, constituent features of the present invention will be explained with reference to FIG. 1. In FIG. 1, an encoded-code detection unit 101 as a predetermined-value detection device detects whether or not a specific encoded code (data having a predetermined value) is included in the encoded codes (encoded image) input from the entropy encoding unit 107. In this situation, the specific encoded code signifies, for example, an encoded code, for identifying a boundary, that is inserted by a boundary-code insertion unit 103 as a predetermined-value insertion device.

As an encoded-code detection method that is implemented in the encoded-code detection unit 101, a method is conceivable in which, through bit comparison between bit strings input from the entropy encoding unit 107 and a specific encoded code, it is detected that the specific encoded code is included. In addition, with regard to the timing at which the specific encoded code is detected, for example, the following methods are enumerated:

(1) A method in which the detection is implemented each time a pixel is encoded;
(2) A method in which the detection is implemented each time a pixel block is encoded; and
(3) A method in which the detection is implemented after an image is completely encoded.

In particular, because it can save capacity for temporary storage of encoded data, the detection method on a pixel basis is preferable. In this regard, however, a case occurs in which a specific encoded code is formed, based on a combination of neighboring pixels; therefore, even in the case of the comparison on a pixel basis, the detection is required to be implemented in an encoded data string consisting of neighboring pixels.

Additionally, when, in the case where a specific encoded code is inserted in a byte-aligned manner, a non-byte-aligned specific encoded code is detected, that detected code may be neglected.

A encoded-code transformation unit 102 as a predetermined-value transformation device is a transformation processing unit that transforms a specific encoded code detected in the encoded-code detection unit 101 into another encoded code that is different from the specific encoded code. Methods of transforming an encoded code include a method in which an encoded code is directly transformed, a method in which quantized pixel values that have not been encoded by the entropy encoding unit 107 are transformed, and the like. In particular, because the method of directly transforming an encoded code can omit processing of encoding an encoded code again in the entropy encoding unit 107, it is a preferable method, in view of processing efficiency. In addition, in accordance with the Huffman encoding processing described with reference to FIG. 3, an encoded code is configured of a Huffman code and a pixel value to be encoded. Accordingly, an encoded code to be transformed is the entire encoded code consisting of a Huffman code and a pixel value to be encoded, only a pixel value to be encoded, or the like. Among those, in view of the degree of effect on the image quality of a transformed image, it is preferable that the encoded code to be transformed consists of a pixel value to be encoded only.

In the transformation, of only a pixel value to be encoded, that is a preferred example of transformation of an encoded code, it is preferable that the transformation is limited so as to be applied only to the lower bits of a pixel value to be encoded, in order to reduce as much as possible effects on the original image.

A boundary-code insertion unit 103 is a processing unit that inserts a specific encoded code for detecting a specific position such as a block boundary. As a specific encoded code to be inserted in the boundary-code insertion unit 103, a pixel value to be encoded is modified and inserted. Accordingly, the modified pixel value is different from the original pixel value to be encoded, whereby deterioration in the image quality is caused. It is necessary that, in order to suppress the deterioration in the image quality, processing of deleting (clearing to "0") the inserted encoded code is implemented, in the process of decoding processing.

Figure 4:
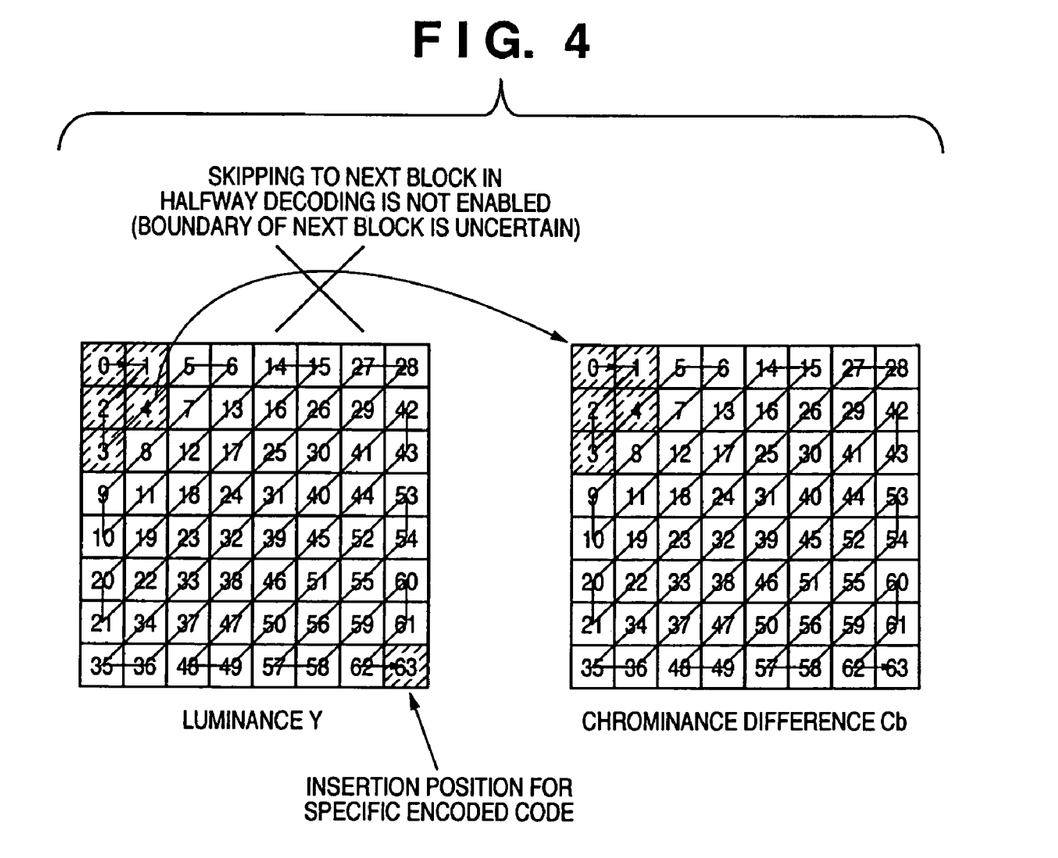
FIG. 4 is a chart for explaining an issue in JPEG decoding processing.

The position at which a specific encoded code is inserted is a position at which a plurality of pixel values end, a position at which a block ends, a position at which an MCU (Minimum Coded Unit) ends, or the like. It can be considered that, among those, the insertion of a specific encoded code at the ending position of a block is most preferable. In the JPEG encoding method, no marker code for identifying a block boundary is prepared. In consequence, as represented in FIG. 4, it has been a problem that it is impossible to, in the process of decoding an JPEG encoded image, cancel the processing during decoding of a block and then start decoding processing for the following block. FIG. 4 is a chart representing with arrows the sequence of Huffman decoding for neighboring blocks (luminance Y and chrominance difference Cb). It is necessary to identify the starting position of the chrominance difference Cb so that, after decoding of the gray portion, in the luminance Y block, is completed, the decoding of the starting position of the chrominance difference Cb is started. However, in the case of a JPEG encoded image, only after all pixel values in the luminance Y block are decoded, the starting position of the chrominance difference Cb block can be identified. Thus, as a preferred example described above, a specific encoded code is inserted at the ending position of a block. In the case of a JPEG image with the specific encoded codes inserted at the block boundaries thereof, detection of the specific encoded codes enables the block boundaries to be identified.

An advantage, from another view point, of the insertion of specific encoded codes at the ending positions of blocks is that it is possible to suppress as much as possible the deterioration, in the image quality, that is caused through the insertion of the specific encoded codes. A quantized pixel at the ending position of a block corresponds to a high-frequency component area and does not significantly affect the image quality. Therefore, for example, even in the case where, as represented in FIG. 4, a specific encoded code is inserted at the ending (63rd) position of the block and deleted (cleared to "0") in the process of decoding processing, the effect on the decoded pixel value is reduced. From the foregoing point of view, it can be considered that the insertion of a specific encoded code at the ending position of a block is most preferable.

With regard to selection of the insertion position for a specific encoded code, various methods, such as insertion at a byte-aligned position or insertion regardless of byte alignment, are conceivable. In the case where the specific encoded code is inserted at a byte-aligned position, bits are required to be inserted in order for the byte alignment to be formed, whereby a problem occurs that encoded data increases to some extent. However, considering processing efficiency in detecting the specific encoded codes and reduction, through providing restriction of byte alignment, of the occurrence rate of specific encoded codes within an encoded image, it is preferable to insert specific encoded codes at byte-aligned positions.

In the case where the method of inserting at byte-aligned positions is employed, it can be defined that specific encoded codes detected in the encoded-code detection unit 101 are each in a byte aligned condition. Specific encoded codes that do not start at the respective starting points of bytes are not required to be detected in the encoded-code detection unit 101.

An example of the method of inserting specific encoded codes at byte-aligned positions will be explained with reference to FIGS. 5A, 5B, 5C, and 5D. FIGS. 5A, 5B, 5C, and 5D are charts for explaining the typical Huffman code table described in the JPEG specification (JISX4301: Digital Compression and Coding of Continuous-Tone Still Images). Even in the case where a Huffman code table other than the above, the same method is possible.

Figure 5A:
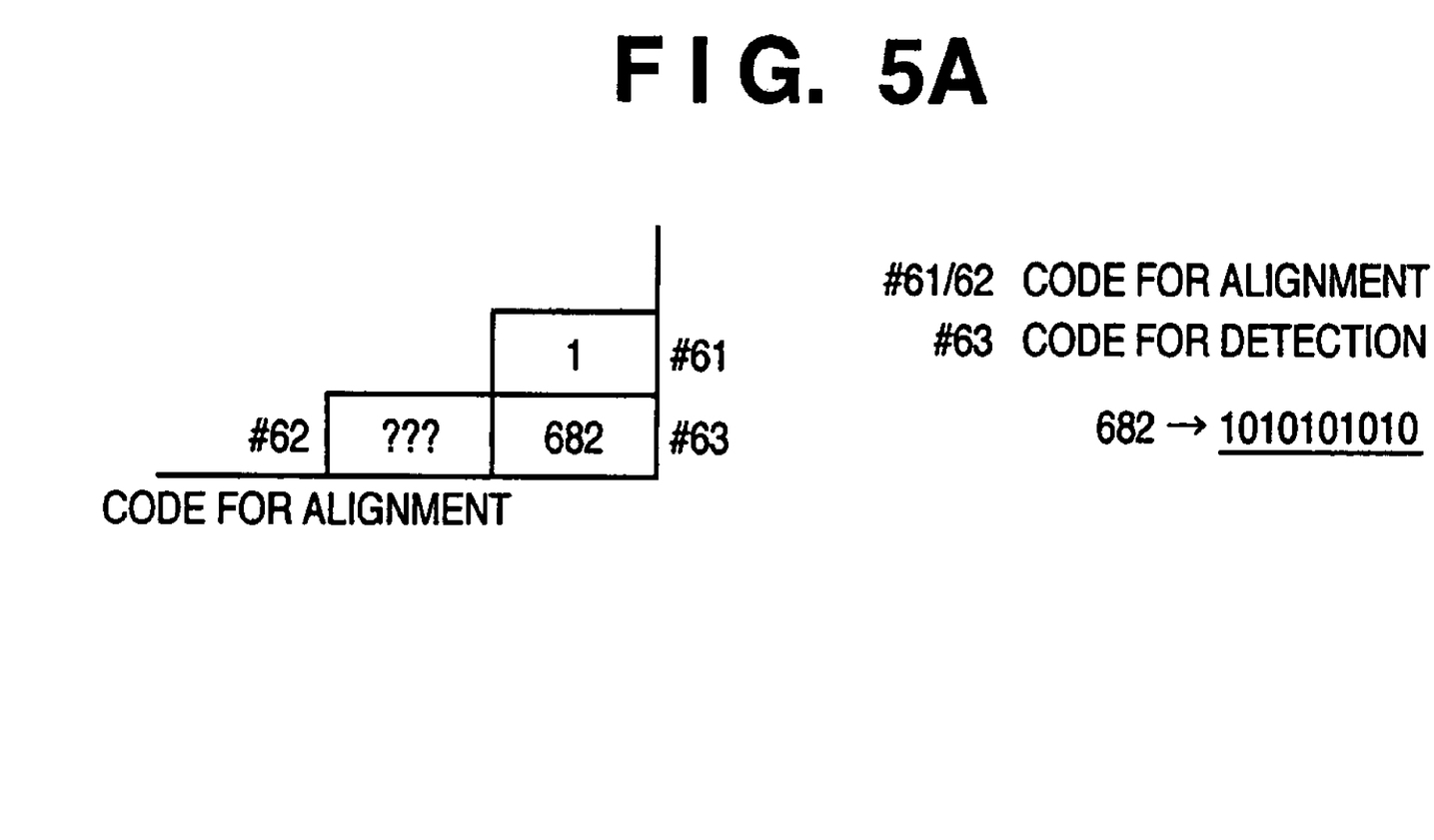
FIGS. 5A, 5B, 5C, and 5D are charts for explaining a method, of inserting a byte-aligned encoded code, according to an embodiment of the present invention.

As illustrated in FIG. 5A, a specific encoded code is inserted at the ending position of a block (the 63rd coefficient position); for byte alignment, left neighboring pixel value and upper neighboring pixel value are also utilized concurrently. Therefore, in the process of decoding processing, pixels to be deleted are not only the pixel at the ending position of a block (the 63rd) but also the left neighboring (the 62nd) and upper neighboring (the 61st) pixels, i.e., three pixels.

In the first place, "1" is inserted at the 61st pixel, and then the zero run at the 62nd pixel is fixed to "0". Thereafter, a specific encoded code for detection is inserted at the 63rd pixel. In FIG. 5A, as the specific encoded code for detection, "1010101010 (682)" is utilized. Then, in order to absorb a bit-position deviation at the timing when encoding of the 61st pixel ends, encoding of the 62nd pixel is implemented. In this situation, the "bit-position deviation" signifies the number of bits counted from the byte-alignment position; the value of the bit-position deviation may be from "0" (no deviation) to "7".

Figure 5B:
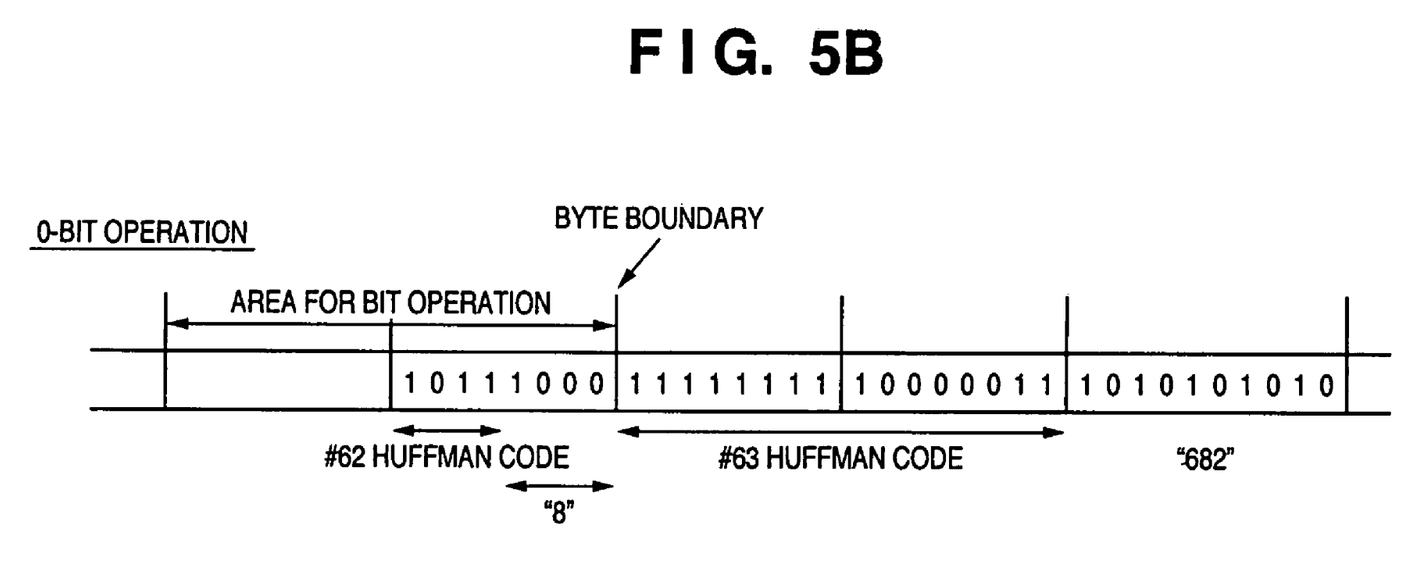

In FIG. 5B, a case where the bit-position deviation is zero is explained. In the case where the bit-position deviation is zero, an 8-bit encoded code may be inserted. Accordingly, as represented in FIG. 5B, the encoded code (total length of 8-bit) of a 4-bit Huffman code and a category "4" is inserted. As a result, the starting position of the specific encoded code is maintained byte-aligned.

Figure 5C:
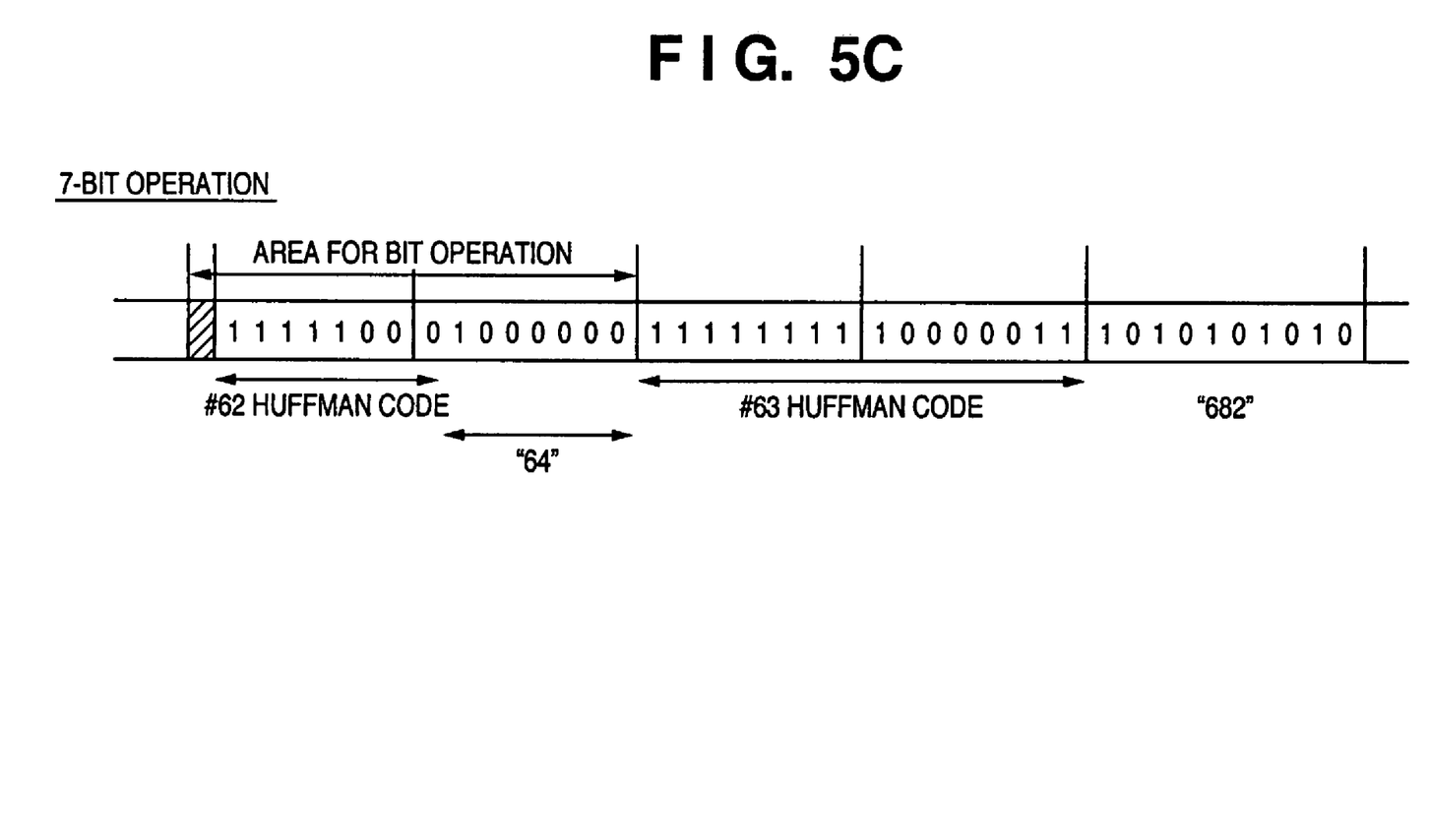

In FIG. 5C, a case where the bit-position deviation is 7 is explained. In order to absorb the deviation, the encoded code consisting of an 8-bit Huffman code and a 7-bit category (total length of 15 bits) is inserted. As represented in FIG. 5C, by inserting 15 bits, it is possible to absorb the 7-bit deviation from the byte-alignment position and to maintain the starting position of the specific encoded code byte-aligned. In addition, in the example described here, the insertion of 15 bits enables the byte alignment; however, in principle, in order to absorb 7-bit deviation, a code consisting of (7+8×α) bits may be inserted.

Figure 5D:
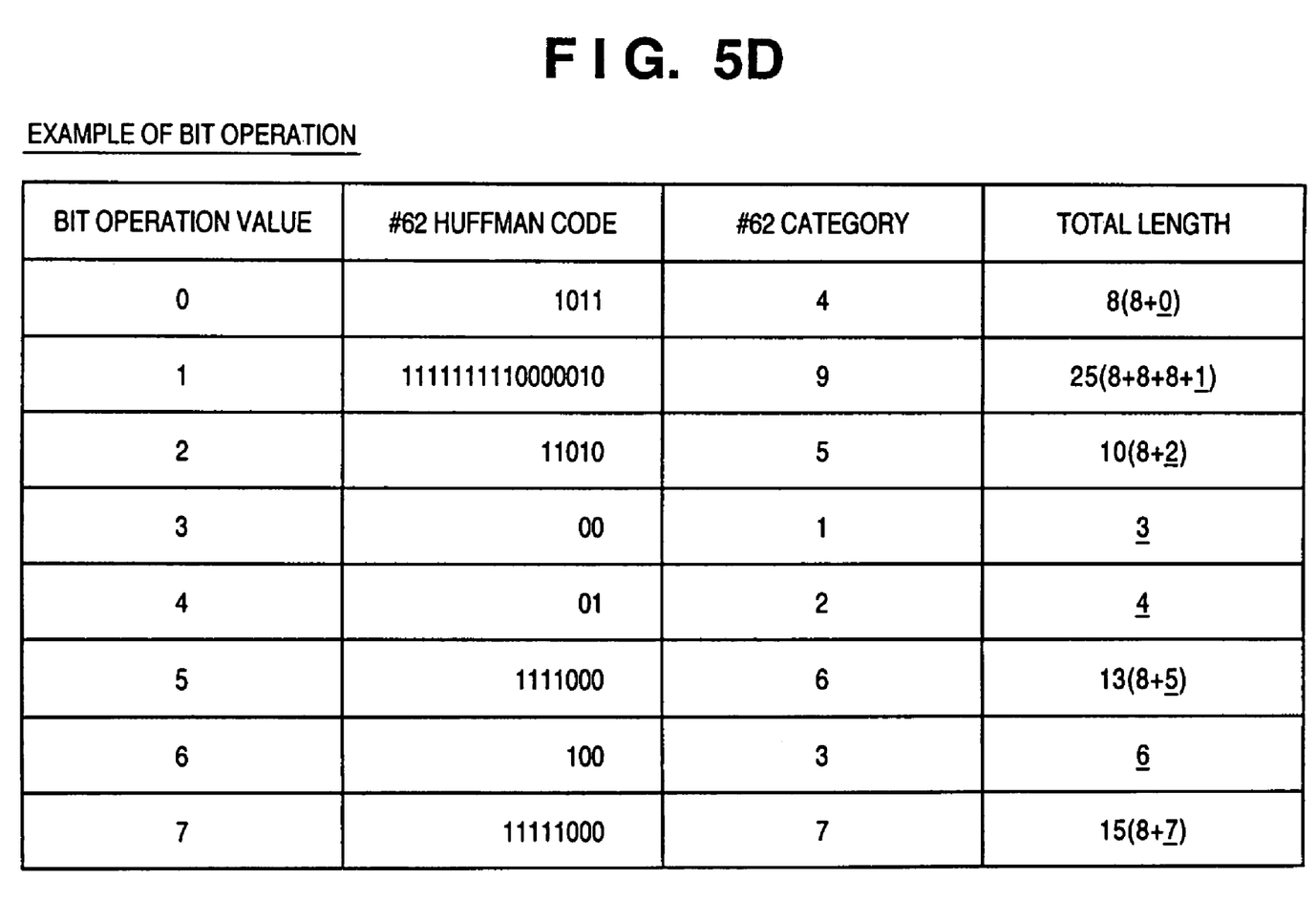

In a table in FIG. 5D, an encoded code to be inserted for each value to be bit-operated is represented. By utilizing the encoded codes as the encoded code for the 62nd coefficient, it is possible to make the specific encoded codes byte-aligned. In addition, the encoded codes represented in FIGS. 5A, 5B, 5C, and 5D are examples; it is possible to implement the byte alignment processing, by means of other encoded codes.

In addition, as explained above, specific encoded codes inserted in the boundary-code insertion unit 103 in FIG. 1 are required to be deleted in the process of decoding processing. That is because, if decoding processing is directly applied to the specific encoded codes, the specific encoded codes are decoded into abnormal values, whereby extreme deterioration in image quality is caused. The insertion methods for specific encoded codes include a method in which inserted specific encoded codes are consciously deleted in the process of decoding, a method in which specific encoded codes are inserted so as to be automatically deleted, and the like. In this situation, "automatically deleted" signifies that the decoding side is not required to consciously delete the specific encoded codes, i.e., that, by employing a normal process of decoding processing, the specific encoded codes are deleted, in the process of decoding processing. In particular, the insertion method in which inserted specific encoded codes are automatically deleted in the process of decoding processing is preferable, in view of simplicity of the decoding processing.

The insertion method in which inserted specific encoded codes are automatically deleted in the process of decoding processing will be explained with reference to FIGS. 6A and 6B. Strictly speaking, the method is a deviation form the JPEG specification.

Figure 6A:
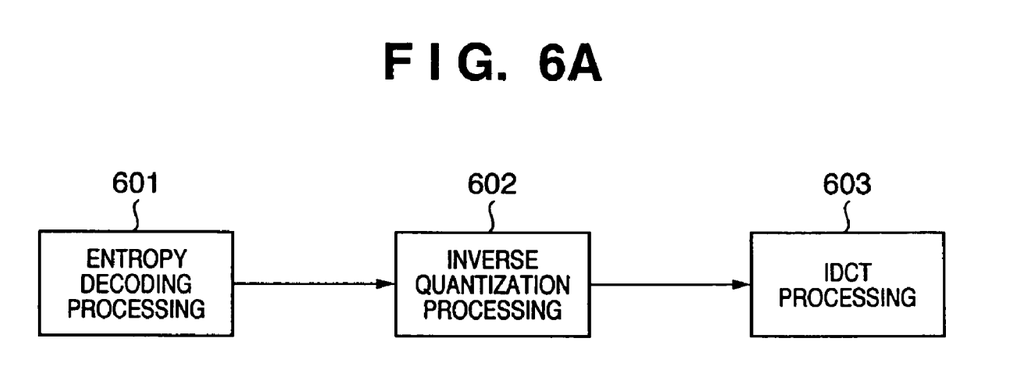
FIGS. 6A and 6B are a diagram and a chart, respectively, for explaining a method, of deleting an encoded code in the process of decoding, according to an embodiment of the present invention.
Figure 6B:
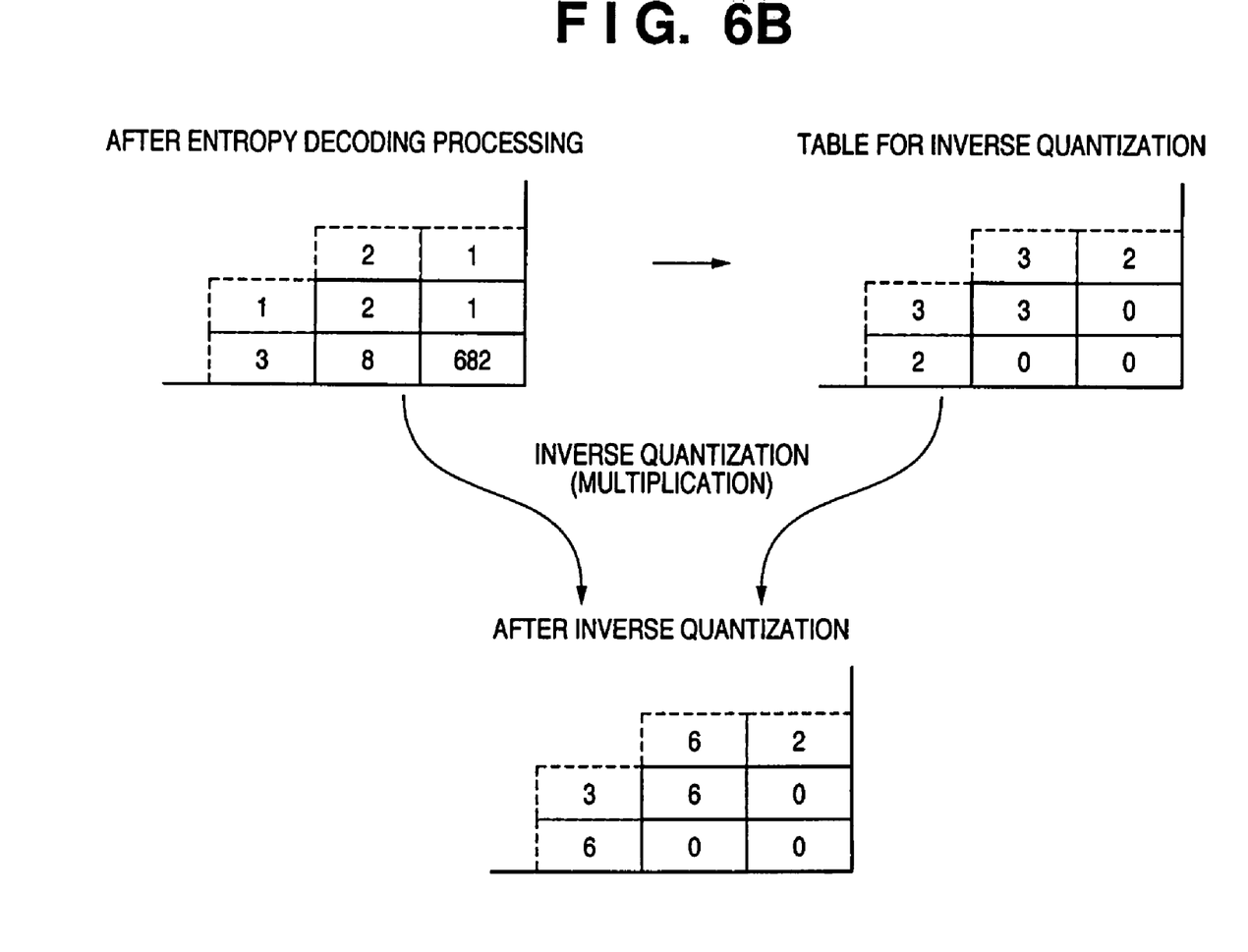

FIGS. 6A and 6B represent the process of JPEG decoding processing. As represented in FIG. 6A, the JPEG decoding processing is realized by reversely implementing the procedure for the JPEG encoding processing method that has been explained with reference to FIG. 1. In the first place, entropy decoding processing 601 is applied to encoded codes. After the Huffman decoding processing, the encoded codes are represented by "after entropy decoding processing" in FIG. 6B. "After entropy decoding processing" in FIG. 6B represents part (the lower-right portion) of the decoded block. After the entropy decoding processing 601, inverse quantization processing 602 is implemented. Then, after implementation of IDCT processing 603, decoding (restoration) of pixels is completed.

The automatic deletion of specific encoded codes is implemented by utilizing the inverse quantization processing 602 in the process of the JPEG decoding processing. In the inverse quantization processing 602, multiplication is applied to the pixels to which the entropy decoding processing 601 has been applied. The multiplication is implemented by utilizing the quantization table that has been utilized in the quantization processing (division) in the process of the JPEG encoding processing. In this situation, it is assumed that three lower-right pixels in "after entropy decoding processing" in FIG. 6B are required to be deleted in the process of the decoding processing. In order to delete in the inverse quantization processing 602 three lower-right pixels, the quantization-table values corresponding to the three pixels may be set "0", as represented in "table for inverse quantization processing" in FIG. 6B. Because multiplication processing is implemented, after the multiplication by "0", the three pixels are cleared to "0", as represented by "after inverse quantization processing" in FIG. 6B

A quantization-coefficient transformation unit 104 in FIG. 1 transforms table values, in a quantization table, corresponding to pixels to be deleted. In encoding processing, the quantization-coefficient transformation unit 104 transforms part of the quantization table that has been utilized for the quantization, in such a way as to set to "0" the table values corresponding to pixels to be deleted in image decoding processing. The transformed quantization table is sent, as part of a JPEG encoded image.

Preferred transformation methods of transforming the quantization table include a method in which "0"s are inserted so that specific encoded codes are deleted, a method in which table values are transformed to appropriate values and the encoded coefficients at the positions where the appropriate values occur are intentionally deleted at the decoding side, and the like.

Example 1

The present invention will be explained in detail below, referring to specific examples.

The present example is a case where the present invention is applied to the encoding processing, illustrated in FIG. 1, for JPEG encoded images. As an application condition, it is assumed that the specific encoded codes are inserted byte-aligned at block boundaries. The insertion of specific encoded codes at block boundaries is implemented in accordance with the method that has been explained with reference to FIGS. 5A, 5B, 5C, and 5D. The typical Huffman code table described in the JPEG specification (JISX4301: Digital Compression and Coding of Continuous-Tone Still Images) is employed as the Huffman table utilized for the JPEG encoding processing.

Figure 7:
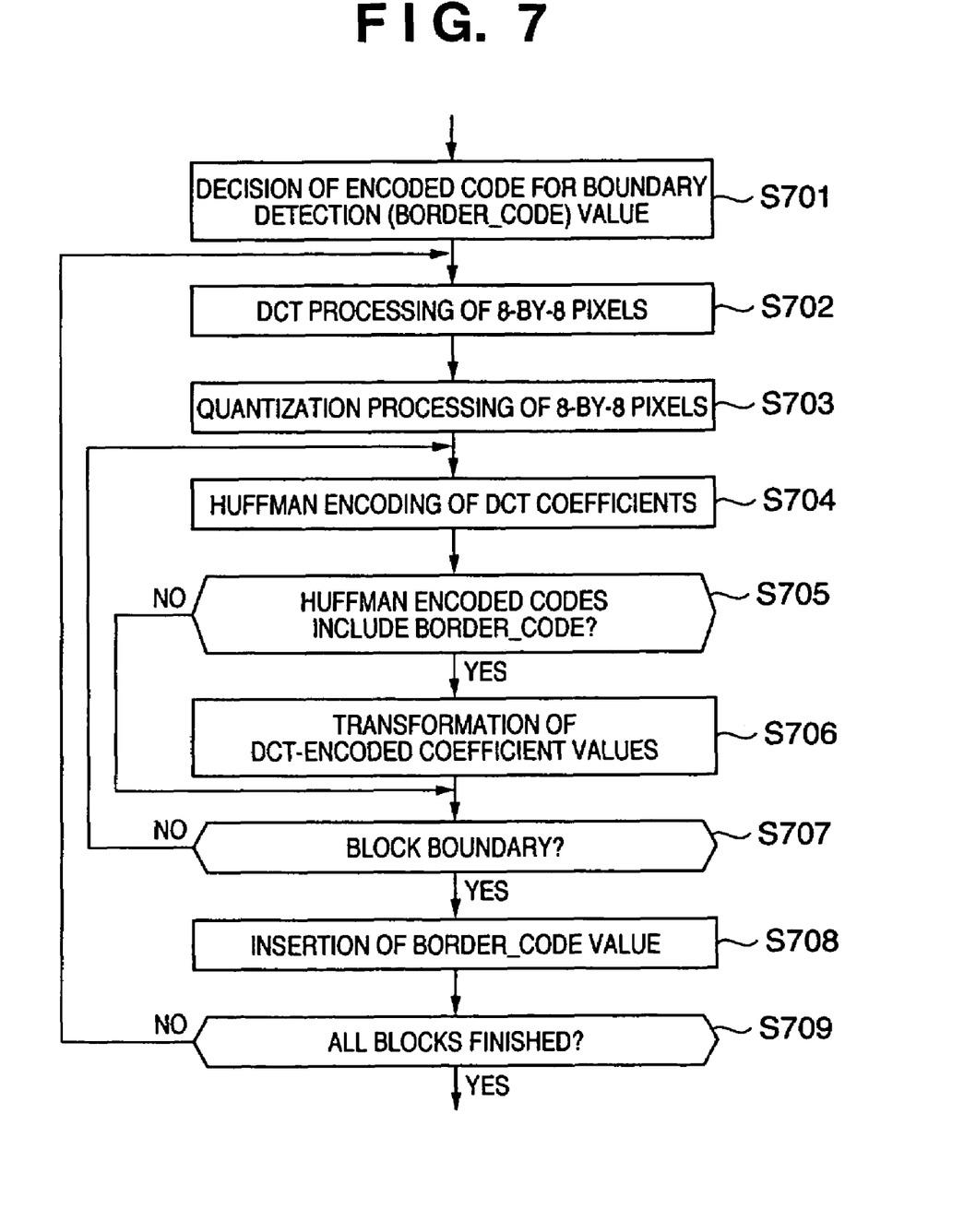
FIG. 7 is a flowchart for explaining an example of the present invention.

The present example will be explained with reference to a flowchart illustrated in FIG. 7. In the first place, in the step S701 in FIG. 7, a boundary-detection encoded code (referred to as a BORDER_CODE, hereinafter) is decided. In the present example, it is decided that the BORDER_CODE is "1010101010" (682) represented in FIGS. 5A, 5B, 5C, and 5D. The BORDER_CODE is a bit string that does not exist in the Huffman code table to be utilized.

In the following step S702, encoding processing of a JPEG image is started. In the step S702, DCT processing of a block is implemented. This step is implemented in the DCT processing unit 105 in FIG. 1.

Thereafter, in the step S703, quantization processing of an 8-by-8 pixel block is implemented. This step is implemented in the quantization processing unit 106 in FIG. 1. The quantization table utilized in the quantization processing is a quantization table that has not transformed in the quantization-coefficient transformation unit 104 in FIG. 1.

In the step S704, Huffman encoding of DCT coefficients (quantized pixel values) is implemented. In this situation, in the step S705, it is determined whether or not the BORDER_CODE is included in the present Huffman encoded code and the Huffman encoded codes before and after the present Huffman encoded code. The reason why existence of the BORDER_CODE is determined is that, if the BORDER_CODE appears at a position where it should not be inserted, erroneous detection of BORDER_CODE may be caused when encoded JPEG data is decoded. The determination is implemented in the encoded-code detection unit 101 in FIG. 1. Because, in the present example, the BORDER_CODE is inserted byte-aligned, BORDER_CODEs that are detected not being byte-aligned are neglected.

In the case where byte-aligned BORDER_CODE is included, transformation of DCT encoded coefficients is implemented in the step S706 so that the format of Huffman encoded code is made so as not to include any BORDER_CODE. This processing is implemented in the encoded-code transformation unit 102 in FIG. 1. In this situation, in order to make the format of Huffman encoded code so as not to include any BORDER_CODE, the transformation is applied only to pixel values, to be encoded, described in the present embodiment. For example, in the case where, in actual encoded pixel values, a pixel value "682" exists, the pixel value "682" is transformed to "683" or the like so that the occurrence of the BORDER_CODE is prevented. This operation makes the original pixel value and the pixel value to be encoded differ from each other, whereby deterioration in image quality may be caused; thus, transformation is implemented in such a way that the difference between the original pixel value and the pixel value to be encoded is small.

In the step S707, the boundary between blocks is determined. In the present example, for the purpose of inserting the BORDER_CODE, three last pixels in a block are utilized, as represented in FIGS. 5A, 5B, 5C, and 5D. Accordingly, at the timing when the encoding of the fourth pixel of the end of a block (the 60th pixel of the start of the block) ends, the boundary of the block is determined. Even if no value exists at the fourth pixel (in the case of "0"), the end of the block is determined, and the processing proceeds to the following step S708.

In the case where the boundary of the block is determined in the step S707, the BORDER_CODE is inserted, in the step S708. This insertion is implemented in the boundary-code insertion unit 103 in FIG. 1. The method of inserting the BORDER_CODE is the same as that explained in the foregoing embodiment, with reference to FIGS. 5A, 5B, 5C, and 5D; the BORDER_CODEs are inserted (interchanged) byte-aligned, by changing encoded codes to be inserted, in accordance with deviation degrees of bit positions.

In the step S709, it is determined whether or not encoding processing for all blocks in the entire input image has been completed; if not completed, the processing from the step S702 to the step S708 is recurrently implemented.

In addition, in the present example, a method is employed in which, in the process of decoding processing of a JPEG image, BORDER_CODEs are deleted. Accordingly, transformation of the quantization table is further implemented, in the step S709. Three last coefficients, of the quantization table, corresponding to the position of the BORDER_CODE inserted in each encoded block are transformed to "0" (refer to FIG. 6B).

The JPEG encoded image created as the foregoing explanation includes BORDER_CODEs with which boundaries between blocks can be identified. As a result, detection of BORDER_CODEs enables the detection of respective ending positions of blocks that are in a state of being encoded; in the case of a normal JPEG image, the ending positions of blocks cannot be identified, unless decoding processing is applied to the blocks. Therefore, in the process of decoding processing utilizing data for a JPEG encoded image, it can be realized to identify the ending positions of blocks, from an arbitrary position, for the encoded JPEG data itself.

According to the invention as described above, it is possible to appropriately implement image encoding.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-115523 filed on Apr. 13, 2005, which is hereby incorporated by reference herein in its entirely.

What is claimed is:

1. An image encoding method executed by at least one processor, the method comprising:
   a detection step of detecting data having a predetermined value that exists within a data group configured of a series of data strings;
   a transformation step of transforming the predetermined value that exists within the data group into another value; and
   a replacing step of, after the transforming the predetermined value into the another value, replacing data at a desired position in the data group with data having the predetermined value using the at least one processor,
   wherein the desired position within the data group indicates a boundary between sub data groups each forming a pixel block made up of a plurality of pixels.

2. An image encoding method executed by at least one processor, the method comprising:
   a detection step of detecting data having a predetermined value that exists within a data group configured of a series of data strings;
   a transformation step of transforming the predetermined value that exists within the data group into another value;
   a replacing step of, after the transforming the predetermined value into the another value, replacing data at a desired position in the data group with data having the predetermined value using the at least one processor, and
   wherein the data having the predetermined value situated at the desired position within the data group is deleted during the decoding of an image.

3. An image encoding apparatus comprising:
   a detection unit that detects data having a predetermined value that exists within a data group configured of a series of data strings;
   a transformation unit that transforms the predetermined value that exists within the data group into another value; and
   a replacing unit that, after the transforming the predetermined value into the another value, replaces data at a desired position in the data group with data having the predetermined value,
   wherein the desired position within the data group indicates a boundary between sub data groups each forming a pixel block made up of a plurality of pixels.

4. An image encoding apparatus comprising:
   a detection unit that detects data having a predetermined value that exists within a data group configured of a series of data strings;
   a transformation unit that transforms the predetermined value that exists within the data group into another value; and
   a replacing unit that, after the transforming the predetermined value into the another value, replaces data at a desired position in the data group with data having the predetermined value,
   wherein the data having the predetermined value situated at the desired position within the data group is deleted during the decoding of an image.

* * * * *